United States Patent
Pal et al.

(10) Patent No.: US 10,142,412 B2
(45) Date of Patent: *Nov. 27, 2018

(54) MULTI-THREAD PROCESSING OF SEARCH RESPONSES

(71) Applicant: Splunk Inc., San Francisco, CA (US)

(72) Inventors: Sourav Pal, Foster City, CA (US);
Christopher Madden Pride, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/913,079

(22) Filed: Mar. 6, 2018

(65) Prior Publication Data

US 2018/0198858 A1    Jul. 12, 2018

Related U.S. Application Data

(63) Continuation of application No. 15/334,690, filed on Oct. 26, 2016, now Pat. No. 9,942,318, which is a continuation of application No. 14/448,995, filed on Jul. 31, 2014, now Pat. No. 9,509,765.

(51) Int. Cl.
| | |
|---|---|
| *G06F 15/167* | (2006.01) |
| *H04L 29/08* | (2006.01) |
| *H04L 12/26* | (2006.01) |
| *G06F 17/30* | (2006.01) |

(52) U.S. Cl.
CPC ........ *H04L 67/1087* (2013.01); *G06F 15/167* (2013.01); *G06F 17/30864* (2013.01); *H04L 43/106* (2013.01); *H04L 43/16* (2013.01); *H04L 67/02* (2013.01); *H04L 67/1004* (2013.01)

(58) Field of Classification Search
CPC . H04L 16/1087; H04L 67/1004; H04L 43/16; H04L 67/02; H04L 43/106; H04L 17/30864
See application file for complete search history.

(56) References Cited

U.S. PATENT DOCUMENTS

| | | |
|---|---|---|
| 6,205,498 B1 | 3/2001 | Habusha et al. |
| 6,208,638 B1 | 3/2001 | Rieley et al. |
| 8,412,696 B2 | 4/2013 | Zhang et al. |
| 8,589,403 B2 | 11/2013 | Marquardt et al. |
| 8,682,925 B1 | 3/2014 | Marquardt et al. |

(Continued)

OTHER PUBLICATIONS

Splunk App for PCI Compliance User Manual 2.1.1, Incident Review dashboard, Generated: 10/2612016, http://docs.splunk.com/index.php?title=Documentation:PCI:User:IncidentReviewdashboard:2.0Beta&action=pdfbook&version=2.1.1 &topic=1 &product=PCI, 2 pages.

(Continued)

*Primary Examiner* — Krisna Lim
(74) *Attorney, Agent, or Firm* — Lowenstein Sandler LLP

(57) ABSTRACT

Multi-thread processing of search responses is disclosed. An example method may include transmitting, by a computer system, a search request to a plurality of search peers of a data aggregation and analysis system; receiving a plurality of data packets from the plurality of search peers; parsing, by a first processing thread of the computer system, one or more data packets of the plurality of data packets, to produce a partial response to the search request; and processing, by a second processing thread of the computer system, the partial response to produce a memory data structure representing an aggregated response to the search request.

20 Claims, 19 Drawing Sheets

(56) References Cited

U.S. PATENT DOCUMENTS

| | | | |
|---|---|---|---|
| 8,826,434 | B2 | 9/2014 | Merza |
| 8,972,992 | B2 | 3/2015 | Fletcher et al. |
| 9,124,612 | B2 | 9/2015 | Vasan et al. |
| 9,130,971 | B2 | 9/2015 | Vasan et al. |
| 9,215,240 | B2 | 12/2015 | Merza et al. |
| 9,509,765 | B2 | 11/2016 | Pal et al. |
| 2002/0181496 | A1 | 12/2002 | Narasimhan et al. |
| 2005/0050540 | A1 | 3/2005 | Shaughnessy et al. |
| 2006/0129650 | A1 | 6/2006 | Ho et al. |
| 2009/0228460 | A1 | 9/2009 | Martinez et al. |
| 2013/0047270 | A1 | 2/2013 | Lowery et al. |
| 2013/0318236 | A1 | 11/2013 | Coates et al. |
| 2013/0318603 | A1 | 11/2013 | Merza |
| 2013/0326620 | A1 | 12/2013 | Merza et al. |
| 2014/0160238 | A1 | 6/2014 | Yim et al. |
| 2014/0324862 | A1 | 10/2014 | Bingham et al. |
| 2016/0036716 | A1 | 2/2016 | Pal et al. |

OTHER PUBLICATIONS vSphere Monitoring and Performance, https://docs.vmware.com/en/VMware-vSphere/6.5l/vsphere-esxi-vcenter-server-651-monitoring-performance-guide.pdf, 184 pages.

Bitincka, Ledion, et al., "Optimizing Data Analysis with a Semi-Structured Time Series Database", Splunk Inc., 2010, pp. 1-9.

Carasso, David, "Exploring Splunk Search Processing Language (SPL) Primer and Cookbook", Splunk Inc., 2012 CITO Research, New York, 154 Pages.

http://docs.splunk.com/Documentation/PCI/2.1.1/[000119] User/IncidentReviewdashboard, 2 Pages (Last accessed Aug. 5, 2014).

"vSphere Monitoring and Performance", VMware, Inc., Update 1, vSphere 5.5, EN-001357-02, 2010-2014, pp. 1-174, http://pubs.vmware.com/vsphere-55/topic/com.vmware.ICbase/PDF/vsphere-esxi-vcenter-server-551-monitoring-performance-guide.pdf.

USPTO, Office Action for U.S. Appl. No. 14/448,995, dated Apr. 8, 2016.

USPTO, Notice of Allowance for U.S. Appl. No. 14/448,995, dated Jul. 28, 2016.

USPTO, Office Action for U.S. Appl. No. 15/334,690, dated Sep. 25, 2017.

USPTO, Notice of Allowance for U.S. Appl. No. 15/334,690, dated Nov. 30, 2017.

USPTO, Notice of Allowance for U.S. Appl. No. 15/334,690, dated Feb. 5, 2018.

USPTO, Office Action for U.S. Appl. No. 14/448,928, dated Apr. 6, 2017.

USPTO, Final Office Action for U.S. Appl. No. 14/448,928, dated Jun. 26, 2017.

USPTO, Notice of Allowance for U.S. Appl. No. 14/448,928, dated Jul. 21, 2017.

USPTO, Notice of Allowance for U.S. Appl. No. 14/448,928, dated Sep. 20, 2017.

U.S. Appl. No. 14/167,316, filed Jan. 29, 2014.
U.S. Appl. No. 14/266,812, filed Apr. 30, 2014.
U.S. Appl. No. 14/266,817, filed Apr. 30, 2014.
U.S. Appl. No. 14/448,995, filed Jul. 31, 2014.
U.S. Appl. No. 14/448,928, filed Jul. 31, 2014.

```
Original Search: 501
search "error | stats count BY host

Sent to peers: 502
search "error | prestats count BY host (map)

Executed by search head: 503
Merge prestats results received from peers (reduce)
```

MULTI-THREAD PROCESSING OF SEARCH RESPONSES

RELATED APPLICATIONS

This application is a continuation of U.S. patent application Ser. No. 15/334,690 filed on Oct. 26, 2016, issued as U.S. Pat. No. 9,942,318 on Apr. 10, 2018, which is a continuation of U.S. patent application Ser. No. 14/448,995 filed on Jul. 31, 2014, issued as U.S. Pat. No. 9,509,765 on Nov. 29, 2016. The entire content of both above referenced applications is incorporated by reference herein.

TECHNICAL FIELD

The present disclosure is generally related to data processing systems, and is more specifically related to processing of messages from multiple servers.

BACKGROUND

Modern data centers often comprise thousands of hosts that operate collectively to service requests from even larger numbers of remote clients. During operation, components of these data centers can produce significant volumes of machine-generated data. The unstructured nature of much of this data has made it challenging to perform indexing and searching operations because of the difficulty of applying semantic meaning to unstructured data. As the number of hosts and clients associated with a data center continues to grow, processing large volumes of machine-generated data in an efficient manner continues to be a priority.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 8 illustrates an exemplary search query received from a client and executed by search peers in accordance with one or more aspects of the present disclosure;

FIG. 9B illustrates a data summary dialog that enables a user to select various data sources in accordance with one or more aspects of the present disclosure;

DETAILED DESCRIPTION

Figure 1:
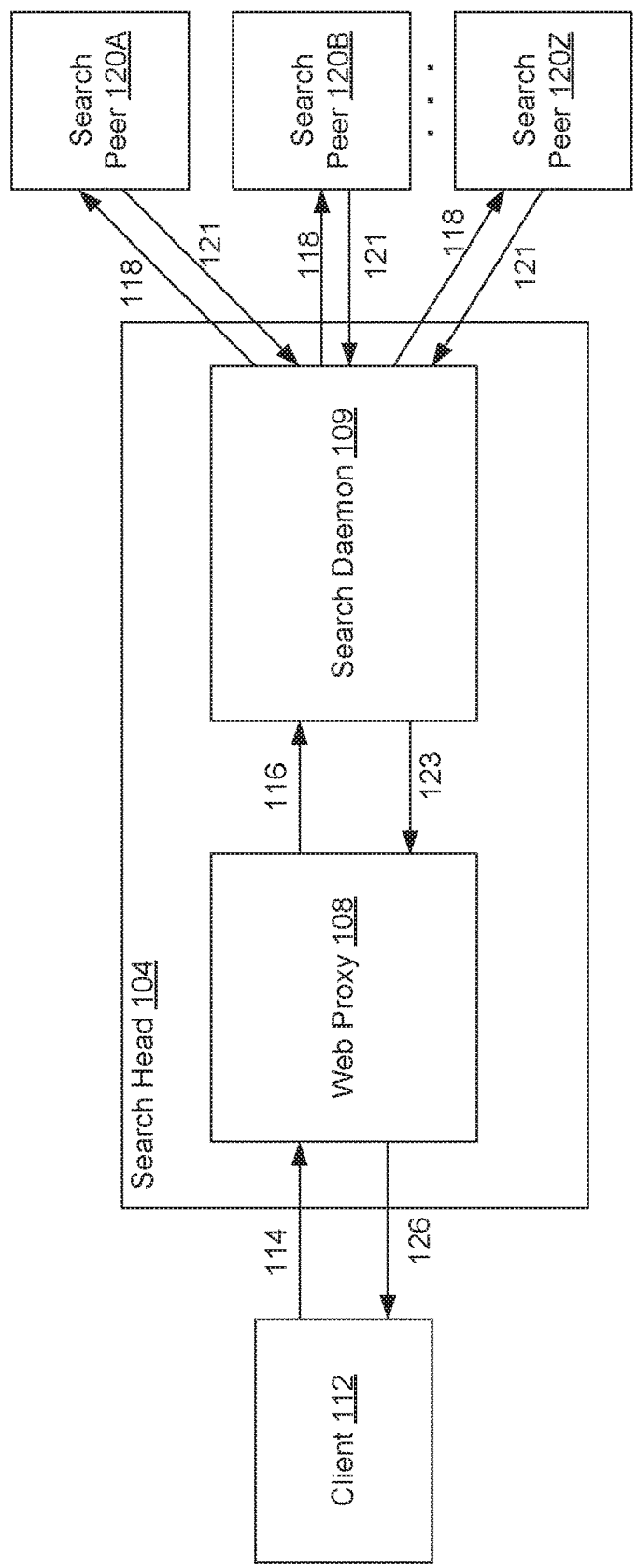
FIG. 1 schematically illustrates an example of request processing by a data aggregation and analysis system, in accordance with one or more aspects of the present disclosure.

Disclosed herein are systems and methods for processing of messages that are asynchronously being received from multiple servers.

An example data aggregation and analysis system may aggregate heterogeneous machine-generated data received from various sources, including servers, databases, applications, networks, etc. The system may be configured to perform real-time indexing of the source data and to execute real-time, scheduled, or historic searches on the source data. A search query may comprise one or more search terms specifying the search criteria. Search terms may include keywords, phrases, Boolean expressions, regular expressions, field names, name-value pairs, etc. The search criteria may comprise a filter specifying relative or absolute time values, to limit the scope of the search by a specific time value or a specific time range.

In certain implementations, the source data may be distributed among a plurality of search servers (also referred to as "search peers") so that each search peer may be responsible for searching the corresponding subset of the source data (also referred to as a "bucket" of data). In various illustrative examples, data buckets may be associated with certain time ranges and/or data sources. Due to the source data being distributed among multiple search servers, two or more search servers may execute certain search requests in parallel, for example using map-reduce techniques, wherein each search peer returns partial results based on the corresponding subset of the source data to a result aggregating server (also referred to as "search head") that produces a combined result corresponding to the search request, as described in more details herein below with references to FIG. 8.

In an illustrative example, a search head may comprise a search daemon and an optional web proxy component. "Search daemon" herein refers to a process that is configured to accept incoming search requests, directly or via the web proxy, from one or more clients and initiate distributed processing of those search requests by one or more search peers. Responsive to receiving a search request, the search daemon may optionally perform certain pre-processing operations on the request, as described in more details herein below. The search daemon may then transmit the pre-processed search request to one or more search peers (e.g., one or more indexers) via one or more transport layer connections.

The search daemon may then aggregate a plurality of response packets received from the search peers into corresponding application layer-messages, and transform the application layer messages into one or more memory data structures representing the search results. The latter operation may involve splitting a payload of each application layer message into two or more parts based on pre-defined bit positions and/or separators, decoding and/or encoding binary data according to certain application-specific encoding rules, and assigning the encoded results to certain fields of one or more resulting memory data structures.

Processing of responses received from a single search peer may include operations having significantly different computational complexities, ranging from a relatively lightweight operation of receiving the network packets to a relatively heavyweight operation of transforming application layer messages into memory data structures representing the search results. Thus, combining those operations into a response processing loop to be performed by a single processing thread may lead to a suboptimal efficiency of the response processing loop: if a new network packet arrives when the processing thread is busy performing the result conversion, the newly arrived network packets would need to be buffered until the current result conversion operation would be completed. Furthermore, having a dedicated thread per search peer may lead to degrading the overall system performance due to a very large number of simultaneously active threads.

Aspects of the present disclosure address the above referenced and other deficiencies by providing efficient mechanisms for processing of messages that are being asynchronously received from multiple servers. While the below description illustrates and refers to processing search results by a search daemon of an example data aggregation and analysis system, same and/or similar systems and methods may be utilized by various data processing systems for processing of messages originated by various types of servers, including application servers, messaging servers, database servers, etc. Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

In the below description and examples, references are made to Open Systems Interconnection (OSI) model layers, including network (layer 3), transport (layer 4), session (layer 5), presentation (layer 6), and application (layer 7), as defined by Recommendation X.200 (July 1994) by International Telecommunications Union (ITU). In the below description and examples, OSI model layers 4-6 may be, for clarity and conciseness of the description, collectively referred to as "sub-application layers".

FIG. 1 schematically illustrates an example of request processing by an example data aggregation and analysis system, in accordance with one or more aspects of the present disclosure. As schematically illustrated by FIG. 1, an example data aggregation and analysis system may comprise a plurality of search peers 120A-120Z communicatively coupled to a search head 104. Search head 104 may comprise a web proxy 108 and a search daemon 109. Web proxy 108 may be configured to communicate to one or more clients 112 to accept incoming search requests and return search results. While in the illustrative example of FIG. 1 web proxy 108 communicates to client 112 via HTTP protocol, various other protocols (e.g., Representational State Transfer (REST) protocols) may be employed to facilitate communications between web proxy 108 and one or more clients 112.

In certain implementations, processing a search query by the example data aggregation and analysis system may be structured as a map-reduce computation, wherein the "map" operations are delegated to search peers 120A-120Z, while the corresponding "reduce" operations are performed by search head 104, as described in more details below with references to FIG. 8.

In an illustrative example, client 112 may transmit, to web proxy 108, a search request 114 that may be wrapped into one or more HTTP requests. In an illustrative example, search request 114 may comprise a query string that may comply with the syntax of a certain query language supported by the data aggregation and analysis system, such as SPLUNK® Search Processing Language (SPL) which is further described herein below.

Responsive to receiving search request 114, web proxy 108 may strip the HTTP payload of various network, transport and HTTP layer headers, and forward the search request 116 to search daemon 109. Responsive to receiving search request 116, search daemon 109 may optionally perform certain pre-processing operations on the request. In certain implementations, search daemon 109 may replace, within the search request, identifiers of certain functions that are supposed to return aggregated parameters of a dataset of interest (such as averages, or other statistical functions applied to specified fields of a plurality of data items) with identifiers of certain corresponding functions, based on the distributed nature of executing the search request. In an illustrative example, responsive to determining that the search request calls for an average of certain values, search daemon 109 may replace, within the search request to be forwarded to search peers 120A-120Z, the average calculation with the sum and the count of those values, since the final aggregation operation (i.e., the averaging operation comprising the summing operation followed by the division operation by the count of the summed values) will be performed by search daemon 109 upon receiving partial search results from each of search peers 120A-120Z. In various other illustrative examples, search daemon 109 may perform various additional pre-processing of search request 116 before forwarding it to search peers 120A-120Z.

Responsive to completing the pre-processing of search request 116, search daemon 109 may forward the resulting pre-processed search request 118 to one or more search peers 120A-120Z. In the illustrative example of FIG. 1, identical search requests 118 are forwarded by search daemon 109 to one or more search peers 120A-120Z. In various other illustrative examples, the search daemon may forward different search requests to different search peers.

In certain implementations, search daemon 109 may communicate to each of search peers 120A-120Z via one or more Transmission Control Protocol (TCP) connections. In an illustrative example, the TCP connections may be initiated by search daemon 109 for each search request and may be terminated upon the full result set has been received from search peers 120A-120Z, as described in more details with references to FIGS. 2A-2B. Alternatively, the TCP connections may be dynamically allocated for each request from a connection pool. In various other implementations, search daemon 109 may communicate to each of search peers 120A-120Z using a connectionless transport layer protocol (e.g., User Datagram Protocol (UDP)).

Responsive to processing search request 118, each of search peers 120A-120Z may transmit, back to search daemon 109, a respective response 121 comprising a partial search result. Search daemon 109 may receive and process a plurality of partial search results 121, as described in more details below with references to FIGS. 2A-2B. Responsive to completing the processing of partial results 121, search daemon 109 may transmit, to web proxy 108, a search response 123 corresponding to search request 116. Web proxy 108 may wrap search response 123 into HTTP response 126 to be transmitted to client 112, thus completing the flow of requests and responses initiated by search request 114.

Figure 2A:
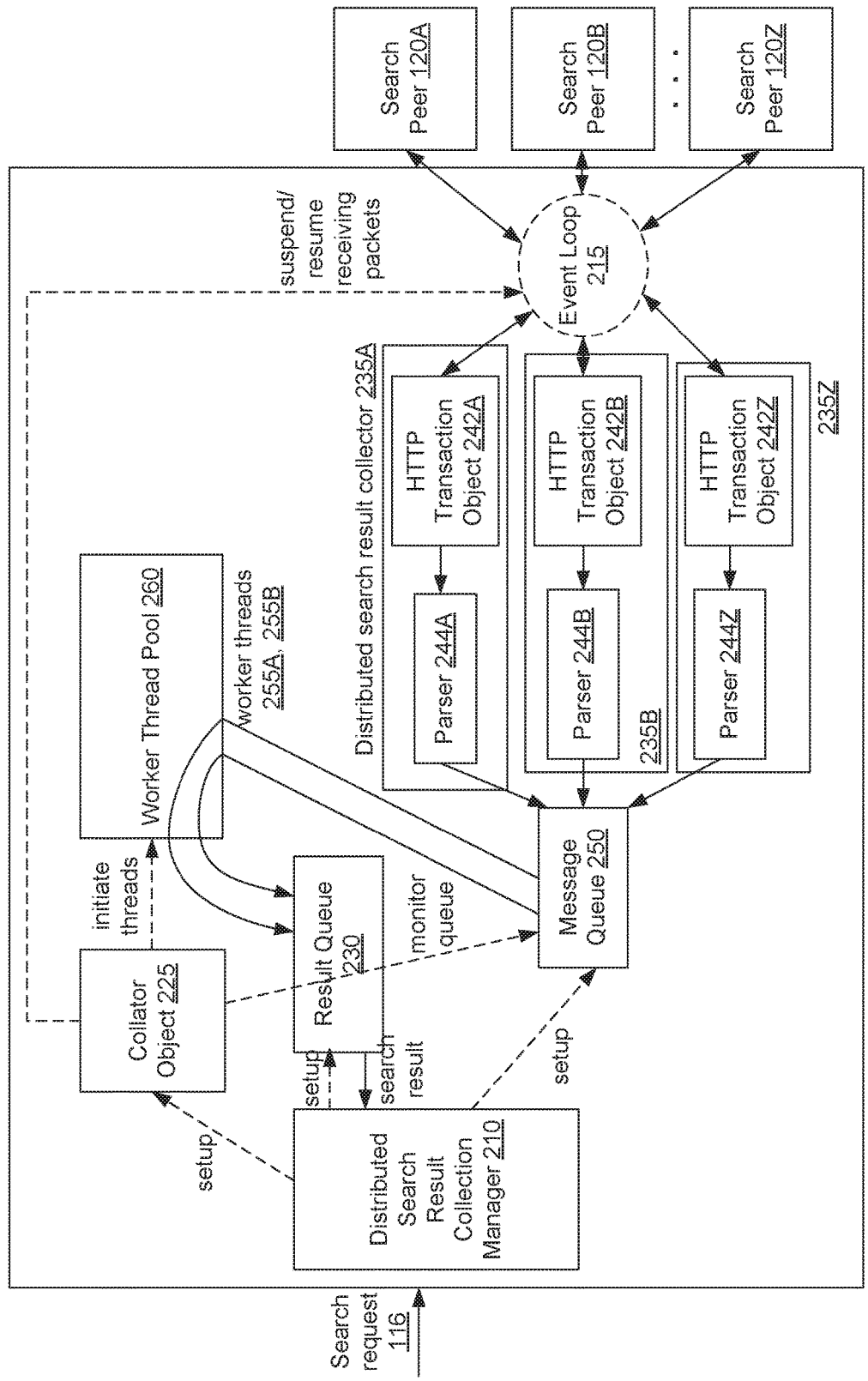
FIG. 2A schematically illustrates asynchronous processing, by a search daemon, of messages received from multiple servers, in accordance with one or more aspects of the present disclosure.
Figure 2B:
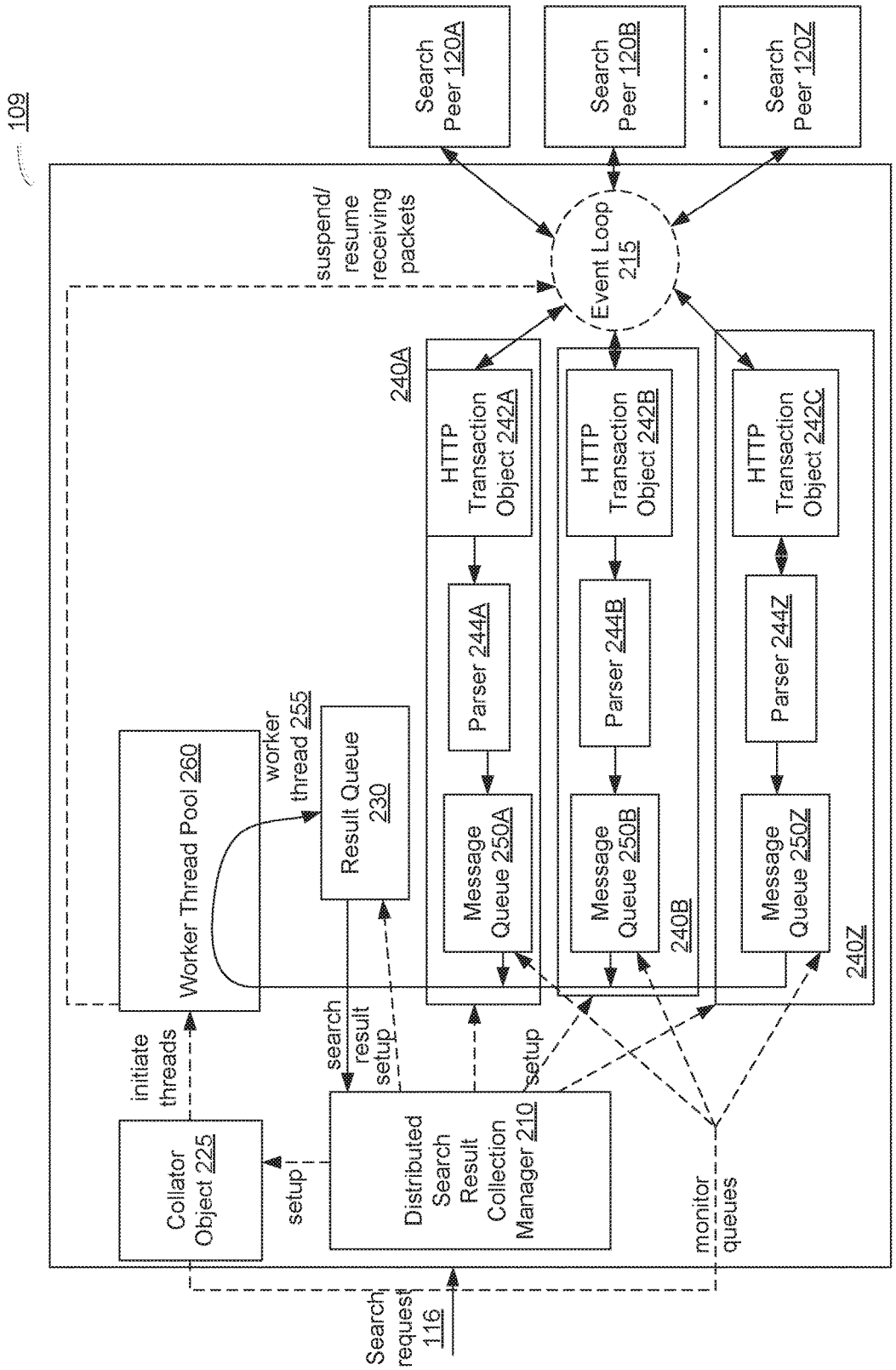
FIG. 2B schematically illustrates priority-based processing, by a search daemon, of messages received from multiple servers, in accordance with one or more aspects of the present disclosure.

FIGS. 2A-2B schematically illustrate various modes of processing search requests by search daemon 109 of FIG. 1. Responsive to receiving a search request from web proxy 108 of FIG. 1, search daemon 109 may create a distributed search result collection manager object 210. The latter may, upon initialization, create and initialize various other objects, including event loop 215, collator object 225, one or more distributed search result collector objects 235A-235Z (for the asynchronous mode of operation) or 240A-240Z (for the priority-based mode of operation), a thread pool 260, a message queue 250, and a result queue 230, as schematically illustrated by FIGS. 2A-2B. Distributed search result collection manager object 210 may specify the values of various operating parameters of the objects being created. In an illustrative example, for distributed search result collector objects 235A-235Z or 240A-240Z, distributed search result collection manager object 210 may specify identifiers (e.g., Universal Resource Identifiers (URI)) of one or more search peers 120A-120Z. In another illustrative example, distributed search result collection manager object 210 may specify maximum sizes of message queue 250 and result queue 230. In yet another illustrative example, distributed search result collection manager object 210 may specify the maximum number of threads in thread pool 260. In yet another illustrative example, distributed search result collection manager object 210 may initialize collator object with pointers to worker thread pool 260, message queues 250A-250Z, and result queue 230.

Search daemon 109 may transmit, via one or more TCP connections, a search request to one or more search peers 120A-120Z. As noted herein above, while the illustrative examples of FIGS. 2A-2B refer to TCP connections, other connection-oriented or connectionless transport layer protocols may be employed by search daemon 109 for communicating to search peers 120A-120Z. Each of search peers 120A-120Z is expected to respond by transmitting a long lived streaming response that may comprise multiple network packets (e.g., TCP packets).

Search daemon 109 may operate in the asynchronous mode of operation or priority-based mode of operation. In certain implementations, the mode of operation may be selected by search daemon 109 based on the type of expected results to be returned by the search, as described in more details herein below. Depending on the chosen mode of operation, collator object 225 may initialize one or more worker threads of thread pool 260 for transforming chunks of data in the form of messages received from search peers 120A-120Z into search results to be placed into result queue 230, as described in more details herein below.

FIG. 2A schematically illustrates asynchronous processing, by a search daemon, of messages received from multiple servers, in accordance with one or more aspects of the present disclosure. In the asynchronous mode of operation, the order in which search results are placed into result queue 230 is neither pre-defined nor guaranteed. In certain implementations, the search results may be placed into result queue 230 in the order they were processed by one or more worker threads 255A-255B of worker thread pool 260, which read application layer messages from message queue 250 and transform each of the application layer messages into one or more memory data structures to be placed into result queue 230, as described in more details herein below.

The asynchronous mode of operation may be used for searches that do not depend on a particular ordering of the data items returned by search peers (e.g., if the search query is expected to return one or more aggregated parameters of a dataset of interest, such as counts, averages, or other statistical functions applied to specified fields of a plurality of data items having the timestamps falling within a certain time range).

Search daemon 109 may create one or more distributed search result collector objects 235A-235Z to be executed within a single processing thread. Each distributed search result collector object 235A-235Z may comprise an HTTP transaction object 242 and a parser object 244. Each HTTP transaction object 242 may be configured with an identifier (e.g., a Universal Resource Identifier (URI)) of a corresponding search peer 120, thus establishing a one-to-one mapping between the distributed search collector object 235 (including its components 242, 244) and the search peer 120.

In either asynchronous or priority-based mode of operation, search daemon 109 may implement an event loop 215 to read the data received via one or more sockets which provide endpoints for the TCP connections to the search peers 120A-120Z. Event loop 215 may be executed in a single processing thread and may asynchronously, in a non-blocking mode, read sub-application layer protocol packets (e.g., TCP packets) received via one or more sockets. "Asynchronous non-blocking mode" herein shall refer to a mode of operation in which event loop 215 would not wait on any of the sockets for the data to be received, but would only read the data from any socket where one or more incoming packets are available. In certain implementations, event loop 215 may process the incoming packets in the order they were received over the plurality of TCP connections.

In certain implementations, event loop 215 may be executed in a dedicated processing thread. Alternatively, a single processing thread may comprise event loop 215 and distributed search result collector objects 235A-235Z.

As a TCP packet is received by event loop 215 from a search peer 120, its payload comprising at least a part of an HTTP response may be forwarded to HTTP transaction object 242 corresponding to search peer 120 that has originated the packet. A payload of at least a part of an HTTP response may comprise at least a part of an application layer message (also referred to as a "fully formed chunk of data"). Parser 244 corresponding to HTTP transaction object 242 that has received payloads of one or more TCP packets originated by the corresponding search peer 120 may package the payloads into one or more application layer messages.

While the illustrative examples described herein employ HTTP protocol over TCP, other OSI sub-application layer (transport, session, and/or presentation layer) protocols may be employed by the example data aggregation and analysis system operating in accordance with one or more aspects of the present disclosure and/or implementing one or more methods described herein.

In the asynchronous mode of operation, parsers 244A-244Z may place the application layer messages into a single message queue 250. Collator object 225 may monitor message queue 250. Responsive to detecting an incoming application layer message in message queue 250, collator object 225 may invoke a worker thread 255 of thread pool 260. The worker thread may convert the application layer message comprising a fully-formed chunk of data into one or more memory data structures storing the search results, and place the data structures into result queue 230. The conversion process may comprise splitting an application layer message into two or more parts based on pre-defined bit positions and/or separators, decoding and/or encoding binary data according to certain application-specific encoding rules, and assigning the encoded results to certain fields of one or more memory data structures to be placed into result queue 230.

In the asynchronous mode of operation, two or more application layer messages may be processed in parallel by two or more worker threads 255A-255B, if such threads are available in worker thread pool 260. Thus, the search results may be placed into result queue 230 in the order they were processed by worker threads 255A-255B of worker thread pool 260 reading application layer messages from message queue 250 and transforming each of the application layer messages into one or more memory data structures to be placed into result queue 230.

In certain implementations, collator object 225 may throttle the incoming messages received by event loop 215 responsive to determining that the total size of application layer messages in message queue 250 exceeds a certain threshold value. Collator object 225 may notify event loop 215 that the socket corresponding to distributed search result collector object 235 that placed the last message into message queue 250 should not be read from until a further notification. Responsive to receiving such a notification, event loop 215 may suspend reading the incoming packets from the specified socket.

Responsive to determining that the total size of application layer messages in message queue 250 falls below the threshold value, collator object 225 may direct event loop 215 to resume reading the incoming packets from the previously suspended socket.

FIG. 2B schematically illustrates priority-based processing, by a search daemon, of messages received from multiple servers, in accordance with one or more aspects of the present disclosure. In the priority-based mode of operation, the search results are placed into result queue 230 in the order of their respective timestamps. In certain implementations, each application layer message may comprise a timestamp inserted by the search peer that has originated the message. Alternatively, each application layer message may comprise a timestamp inserted by one of the components of search daemon 109 (e.g., event loop 215, HTTP transaction object 242, or parser 244) upon receiving and/or processing the application layer message.

The priority-based mode of operation may be used for searches that require that the data items returned by search peers be ordered (e.g., if the search query is expected to retrieve specified fields of a plurality of data items having the timestamps falling within a certain time range).

Search daemon 109 may create one or more distributed search collector objects 240A-240Z to be executed within a single processing thread. Each distributed search collector object 240 may comprise an HTTP transaction object 242, a parser object 244, and a dedicated message queue 250 for storing application layer messages produced by the corresponding parser 244. Each HTTP transaction object 242 may be configured with an identifier (e.g., a Universal Resource Identifier (URI)) of a corresponding search peer 120, thus establishing a one-to-one mapping between the distributed search collector object 240 (including its components 242, 244) and the search peer 120.

As noted above, search daemon 109 may implement an event loop 215 to read the data received via one or more sockets which provide endpoints for the TCP connections to the search peers 120A-120Z. Event loop 215 may be executed in a single processing thread and may asynchronously, in the non-blocking mode, read sub-application layer protocol packets (e.g., TCP packets) received via one or more sockets. "Asynchronous non-blocking mode" herein shall refer to a mode of operation in which event loop 215 would not wait on any of the sockets for the data to be received, but would only read the data from any socket where one or more incoming packets are available. In certain implementations, event loop 215 may process the incoming packets in the order they were received over the plurality of TCP connections.

In certain implementations, event loop 215 may be executed in a dedicated processing thread. Alternatively, a single processing thread may comprise event loop 215 and distributed search result collector objects 240A-240Z.

As a TCP packet is received by event loop 215 from a search peer 120, its payload comprising at least a part of an HTTP response may be forwarded to HTTP transaction object 242 corresponding to search peer 120 that has originated the packet. A payload of at least a part of an HTTP response may comprise at least a part of an application layer message (also referred to as a "fully formed chunk of data"). Parser 244 corresponding to HTTP transaction object 242 that has received payloads of one or more TCP packets originated by the corresponding search peer 120 may package the payloads into one or more application layer messages.

While the illustrative examples described herein employ HTTP protocol over TCP, other OSI sub-application layer (transport, session, and/or presentation layer) protocols may be employed by the example data aggregation and analysis system operating in accordance with one or more aspects of the present disclosure and/or implementing one or more methods described herein.

In the priority-based mode of operation, each of parsers 244A-244Z may place the application layer messages into the corresponding message queue 250A-250Z. Collator object 225 may monitor message queues 250A-250Z. Responsive to detecting an incoming application layer message in one of message queues 250A-250Z, collator object 225 may invoke worker thread 255 to convert the application layer message comprising a fully-formed chunk of data into one or more memory data structures storing the search results, and place the data structures into result queue 230. If application layer messages are available in two or more message queues 250, worked thread 255 would read the application layer message having the most recent timestamp. As the memory data structures should be placed into result queue 230 in the order of their respective timestamps, application layer messages in the plurality of message queues 250A-250Z are processed by a dedicated single worker thread 255, thus providing serialization of the results being placed into result queue 230.

In certain implementations, collator object 225 may throttle the incoming messages received by event loop 215 responsive to determining that the total size of application layer messages in one of message queues 250A-250Z exceeds a certain threshold value. Collator object 225 may notify event loop 215 that the TCP connection corresponding to distributed search result collector object that has overflown the message queue 250 should not be read from until a further notification. Responsive to determining that the total size of application layer messages in the message queue 250 falls below the threshold value, collator object 225 may notify event loop 215 that the incoming messages may now be processed.

FIGS. 3A-3D depict flow diagrams of example methods 300A-300D for processing of messages that are asynchronously being received from multiple servers. Methods 300A-300D and/or each of their respective individual functions, routines, subroutines, or operations may be performed by one or more general purpose and/or specialized processing devices. Two or more functions, routines, subroutines, or operations of methods 300A-300D may be performed in parallel or in an order that may differ from the order described above. In certain implementations, one or more of methods 300A-300D may be performed by a single processing thread. Alternatively, methods 300A-300D may be performed by two or more processing threads, each thread executing one or more individual functions, routines, subroutines, or operations of the respective method. In an illustrative example, the processing threads implementing methods 300A-300D may be synchronized (e.g., using semaphores, critical sections, and/or other thread synchronization mechanisms). Alternatively, the processing threads implementing methods 300A-300D may be executed asynchronously with respect to each other. In an illustrative example, methods 300A-300D may be performed by an example computing device 1000 described herein below with references to FIG. 11. In another illustrative example, methods 300A-300D may be performed by a distributed computer system comprising two or more example computing devices 1000.

Figure 3A:
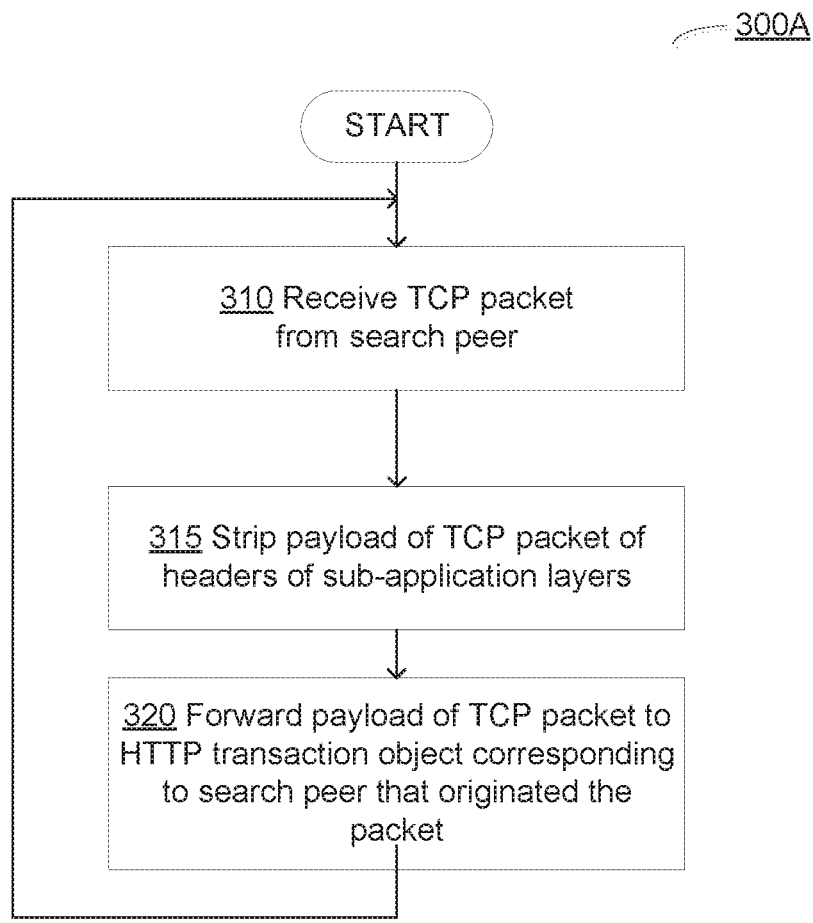
FIGS. 3A-3D depict flow diagrams of example methods 300A-300D for processing of messages that are asynchronously being received from multiple servers, in accordance with one or more aspects of the present disclosure.

FIG. 3A depicts a flow diagram of an example method 300A for receiving incoming sub-application layer packets in the non-blocking asynchronous mode, in accordance with one or more aspects of the present disclosure. As noted herein above, the example data aggregation and analysis system may implement an event loop to read the data received via one or more sockets which provide endpoints for the TCP connections to each of a plurality of search peers. The event loop may be executed in a single processing thread and may asynchronously, in the non-blocking mode, read sub-application layer protocol packets (e.g., TCP packets) received via one or more sockets. "Asynchronous non-blocking mode" herein shall refer to a mode of operation in which the event loop would not wait on any of the sockets for the data to be received, but would only read the data from any socket where one or more incoming packets are available. In certain implementations, the event loop may process the incoming packets in the order they were received over the plurality of TCP connections.

Referring to FIG. 3A, at block 310, a processing thread of the computer system implementing the method may receive, from a search peer, a sub-application layer protocol packet (e.g., a TCP packet).

At block 315, the processing thread may strip the payload of the received TCP packet of the headers of one or more sub-application layers (e.g., TCP headers, IP headers, and Ethernet headers).

At block 320, the processing thread may forward the payload of the received TCP packet to an HTTP transaction object corresponding to the search peer that has originated the TCP packet. The method may loop back to block 310.

Figure 3B:
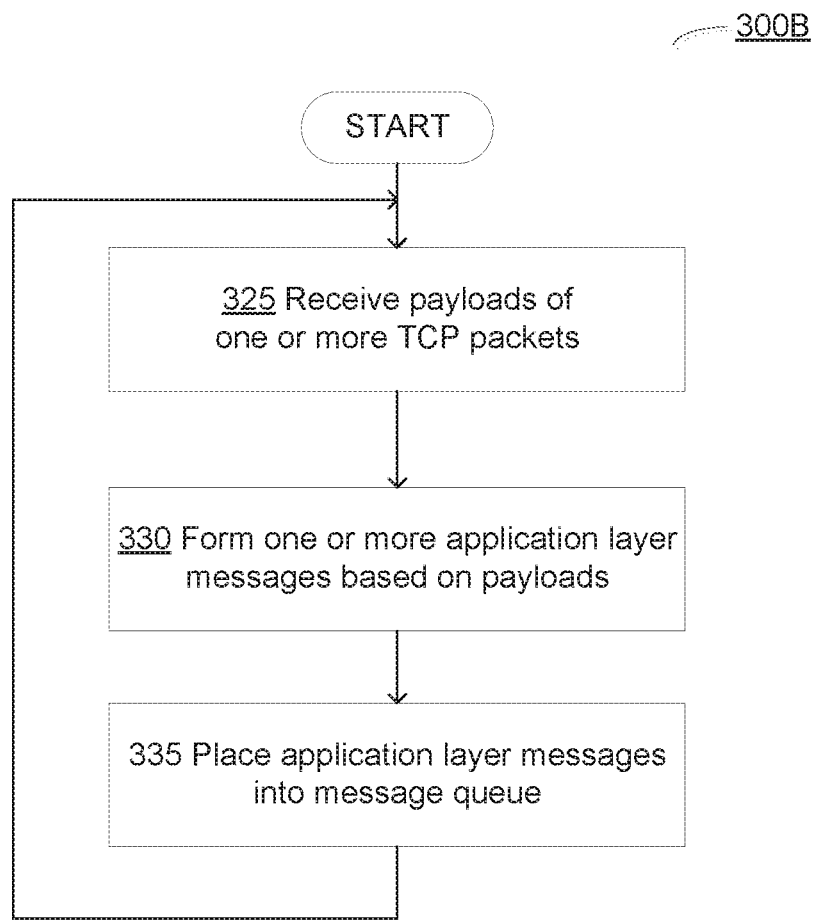

FIG. 3B depicts a flow diagram of an example method 300B for parsing sub-application layer packets to produce application layer messages, in accordance with one or more aspects of the present disclosure. As noted herein above, a parser corresponding to the HTTP transaction object that has received payloads of one or more TCP packets originated by the corresponding search peer may package the payloads into one or more application layer messages.

At block 325, a processing thread of the computer system implementing the method may receive the payloads of one or more sub-application layer packets (e.g., TCP packets).

At block 330, the processing thread may form one or more application layer messages based on the payloads of the received sub-application layer packets. In an illustrative example, one or more payloads of sub-application layer packets may be grouped into a single application layer message based on detecting one or more pre-defined application layer message separators (i.e., certain characters or groups of characters) within the payloads of sub-application layer packets.

At block 335, the processing thread may put one or more application layer messages into a message queue. In the asynchronous mode of operation, the application layer messages formed by parsers corresponding to different search peers are placed in a single message queue. In the priority mode of operation, the application layer messages formed by parsers corresponding to different search peers are placed in different message queues. The method may loop back to block 325.

Figure 3C:
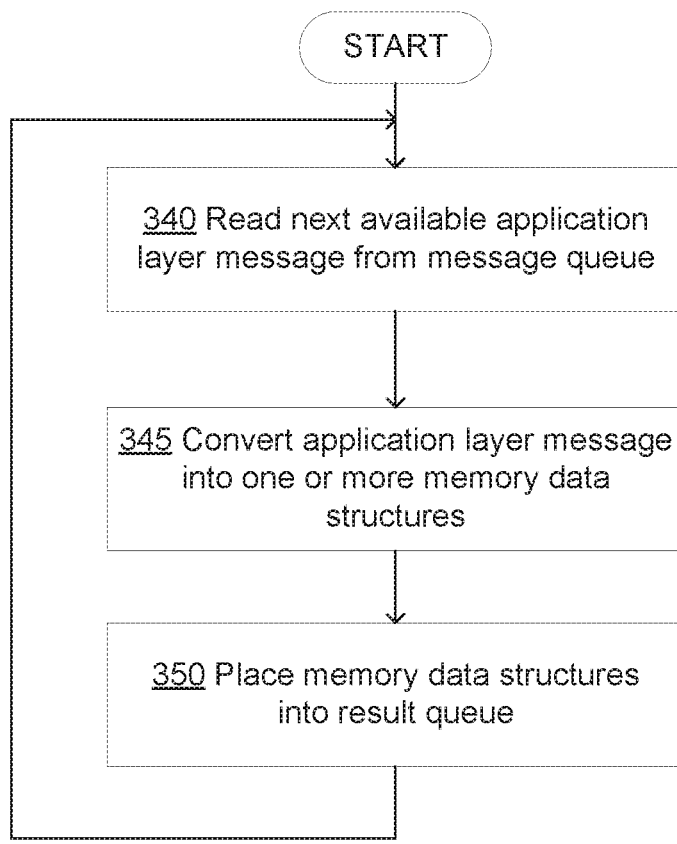

FIG. 3C depicts a flow diagram of an example method 300C for the asynchronous parsing of application layer messages to produce the search results, in accordance with one or more aspects of the present disclosure. As noted herein above, in the asynchronous mode of operation, one or more parsers may place the application layer messages into a single message queue. Responsive to detecting an incoming application layer message in the message queue, the collator object may invoke a worker thread to convert the application layer message into one or more memory data structures storing the search results, and place the data structures into the result queue. The conversion process may comprise splitting an application layer message into two or more parts based on pre-defined bit positions and/or separators, decoding and/or encoding binary data according to certain application-specific encoding rules, and assigning the encoded results to certain fields of one or more memory data structures to be placed into the result queue.

In the asynchronous mode of operation, two or more application layer messages may be processed in parallel by two or more worker threads. Thus, the search results may be placed into the result queue in the order they were processed by one or more worker threads reading application layer messages from the global message queue and transforming each of the application layer messages into one or more memory data structures to be placed into the result queue.

At block 340, a worker thread may read a next available application layer message from a message queue. The worker thread may be one of multiple worker threads reading available application layer messages from a single message queue.

At block 345, the worker thread may convert the application layer message into one or more memory data structures storing the search results. The conversion process may comprise splitting an application layer message into two or more parts based on pre-defined bit positions and/or separators, decoding and/or encoding binary data according to certain application-specific encoding rules, and assigning the encoded results to certain fields of one or more resulting memory data structures. The worker thread may be one of the multiple worker threads processing, in parallel, the application layer messages read from the single message queue.

At block 350, the worker thread may place the resulting memory data structures into the result queue. The resulting memory data structures processed by multiple worker threads may be placed into the result queue in the order they were processed by the multiple worker threads. The method may loop back to block 340.

Figure 3D:
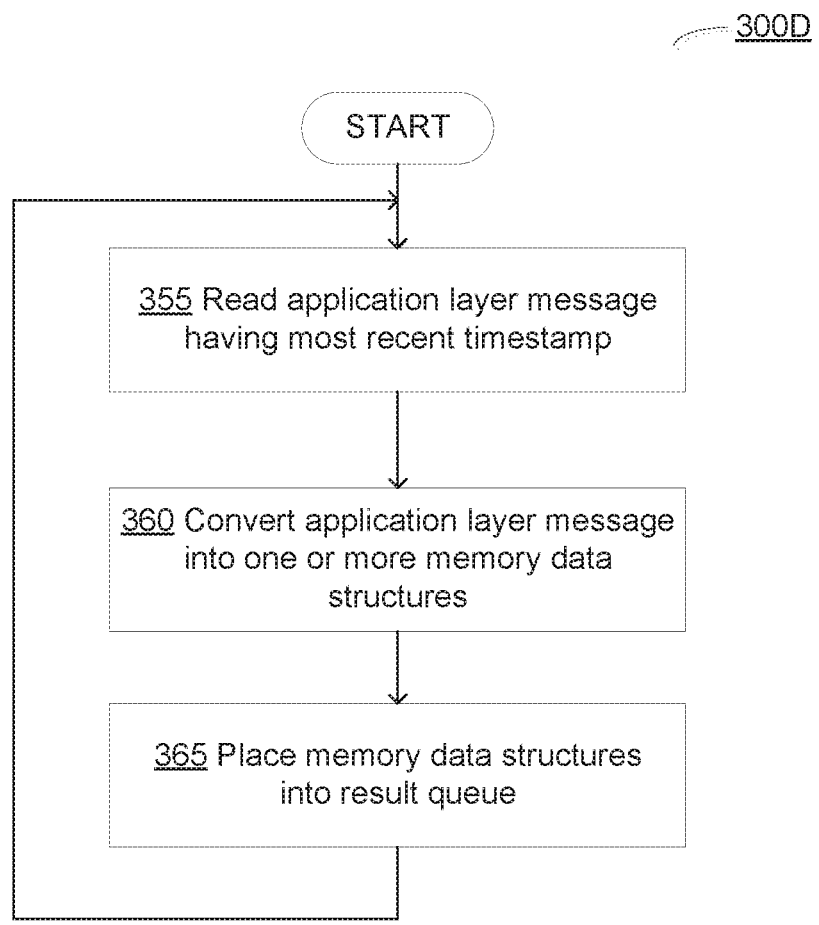

FIG. 3D depict a flow diagram of an example method 300D for the priority-based parsing of application layer messages to produce the search results, in accordance with one or more aspects of the present disclosure. As noted herein above, in the priority-based mode of operation, each of one or more parsers may place the application layer messages into the corresponding message queue. Responsive to detecting an incoming application layer message in one of message queues, the collator object may invoke the worker thread to convert the application layer message into one or more memory data structures storing the search results, and place the data structures into the result queue. If application layer messages are available in two or more message queues, the worked thread would read the application layer message having the most recent timestamp. As the memory data structures should be placed into the result queue in the order of their respective timestamps, application layer messages in the plurality of message queues are processed by a single worker thread, thus providing serialization of the results being placed into the result queue.

At block 355, the worker thread may read a next available application layer message from two or more message queues. If application layer messages are available in two or more message queues, the worked thread reads the application layer message having the most recent timestamp. A single worker thread may be used to read application layer messages from multiple message queues in the order of their timestamps.

At block 360, the worker thread may convert the application layer message into one or more memory data structures storing the search results. The conversion process may comprise splitting an application layer message into two or more parts based on pre-defined bit positions and/or separators, decoding and/or encoding binary data according to certain application-specific encoding rules, and assigning the encoded results to certain fields of one or more resulting memory data structures. Multiple application layer messages from the multiple message queues are processed by the same worker thread.

At block 365, the worker thread may place the resulting memory data structures into the result queue. As the memory data structures are being put into the result queue by a single worker thread, the memory data structure are found in the result queue in the order of their respective timestamps, as described in more details herein above. The method may loop back to block 355.

The systems and methods described herein above may be employed by various data processing systems, e.g., data aggregation and analysis systems. In certain implementations, the example data aggregation and analysis system may perform search queries on performance data that stored as "events," wherein each event comprises a collection of performance data and/or diagnostic information that is generated by a computer system and is correlated with a specific point in time. In various illustrative examples, the data processing system may be represented by the SPLUNK® ENTERPRISE system produced by Splunk Inc. of San Francisco, Calif., to store and process performance data. The data processing system may be configured to execute search queries as correlational searches, as described in more details herein below.

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

Figure 4:
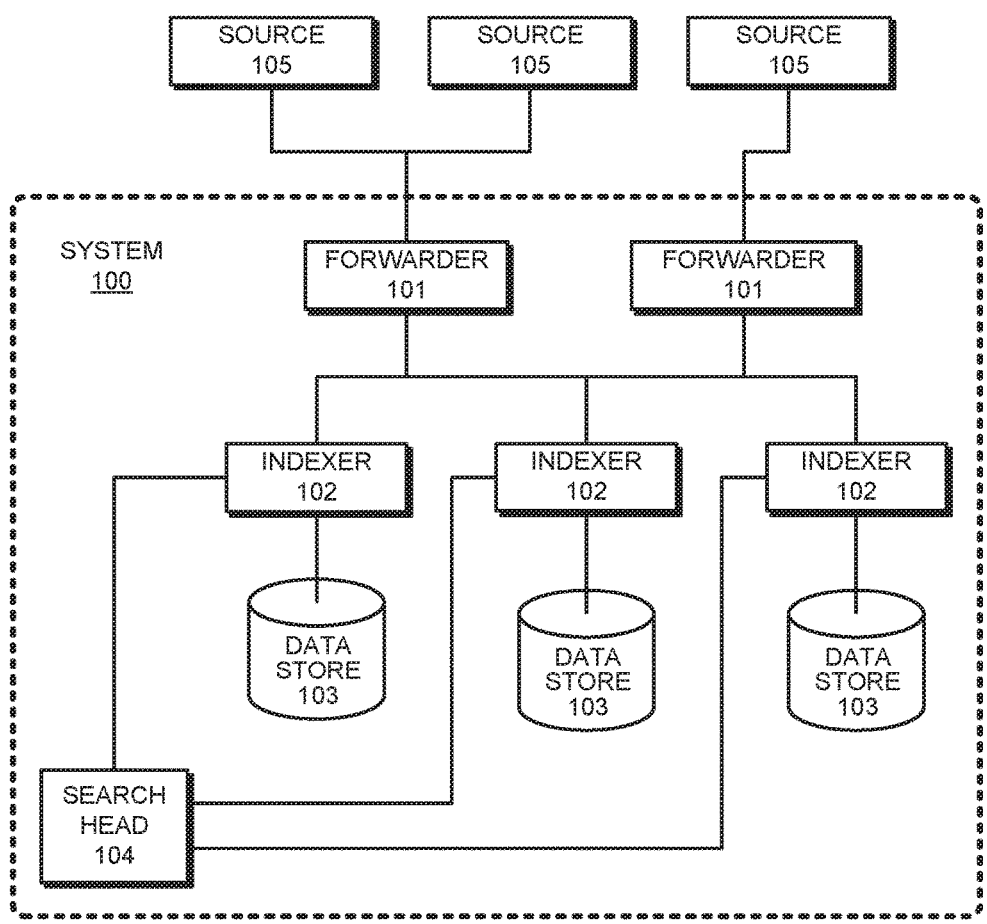
FIG. 4 presents a block diagram of an event-processing system in accordance with one or more aspects of the present disclosure.

FIG. 4 presents a block diagram of an exemplary event-processing system 100, similar to the SPLUNK® ENTERPRISE system. System 100 includes one or more forwarders 101 that collect data obtained from a variety of different data sources 105, and one or more indexers 102 that store, process, and/or perform operations on this data, wherein each indexer operates on data contained in a specific data store 103. These forwarders and indexers can comprise separate computer systems in a data center, or may alternatively comprise separate processes executing on various computer systems in a data center.

During operation, the forwarders 101 identify which indexers 102 will receive the collected data and then forward the data to the identified indexers. Forwarders 101 can also perform operations to strip out extraneous data and detect timestamps in the data. The forwarders next determine which indexers 102 will receive each data item and then forward the data items to the determined indexers 102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 100 and the processes described below with respect to FIGS. 5-10 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

Figure 5:
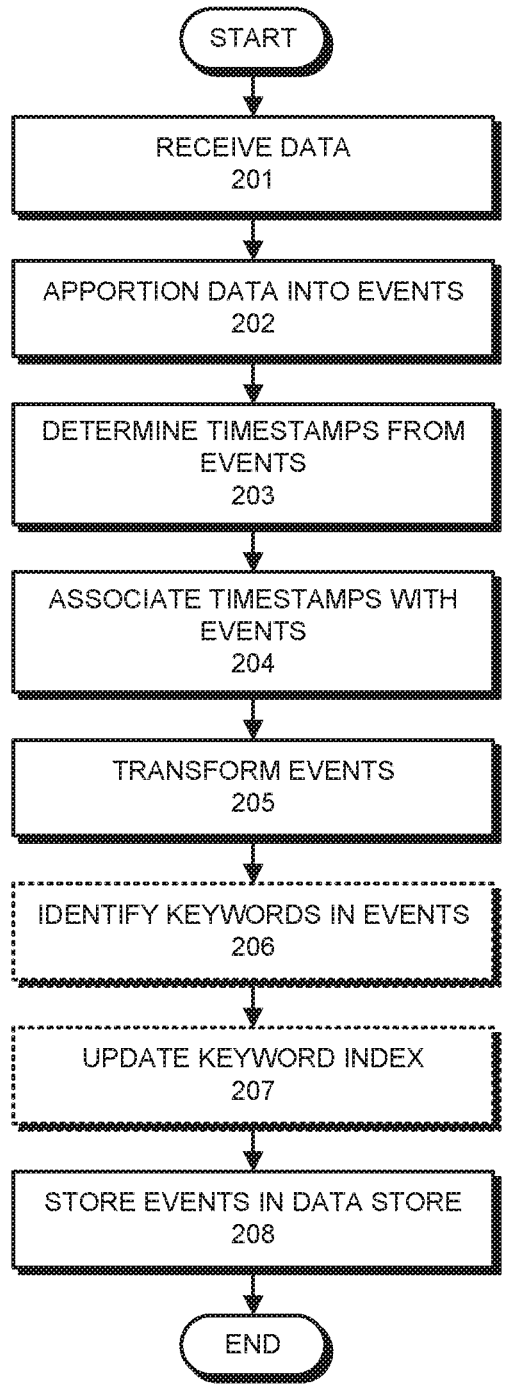
FIG. 5 presents a flowchart illustrating how indexers process, index, and store data received from forwarders in accordance with one or more aspects of the present disclosure.

FIG. 5 presents a flowchart illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 102 is responsible for storing and searching a subset of the events contained in a corresponding data store 103. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. Pat. No. 9,130,971 issued on Sep. 8, 2015, and in U.S. Pat. No. 9,124,612 issued on Sep. 1, 2015.

Figure 6:
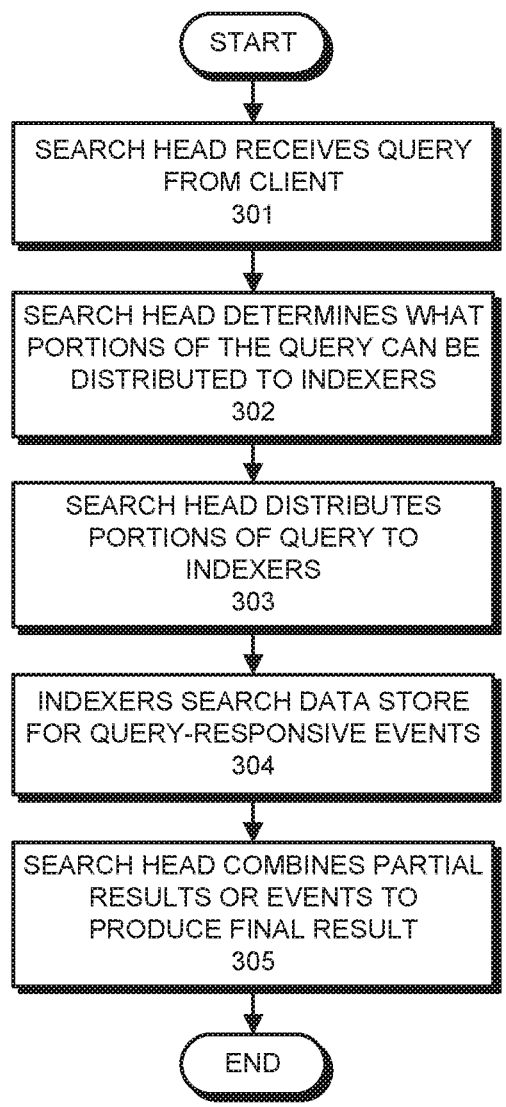
FIG. 6 presents a flowchart illustrating how a search head and indexers perform a search query in accordance with one or more aspects of the present disclosure.

FIG. 6 presents a flowchart illustrating how a search head and indexers perform a search query in accordance with the disclosed embodiments. At the start of this process, a search head receives a search query from a client at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 304 may involve using the late-binding scheme to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

Figure 7:
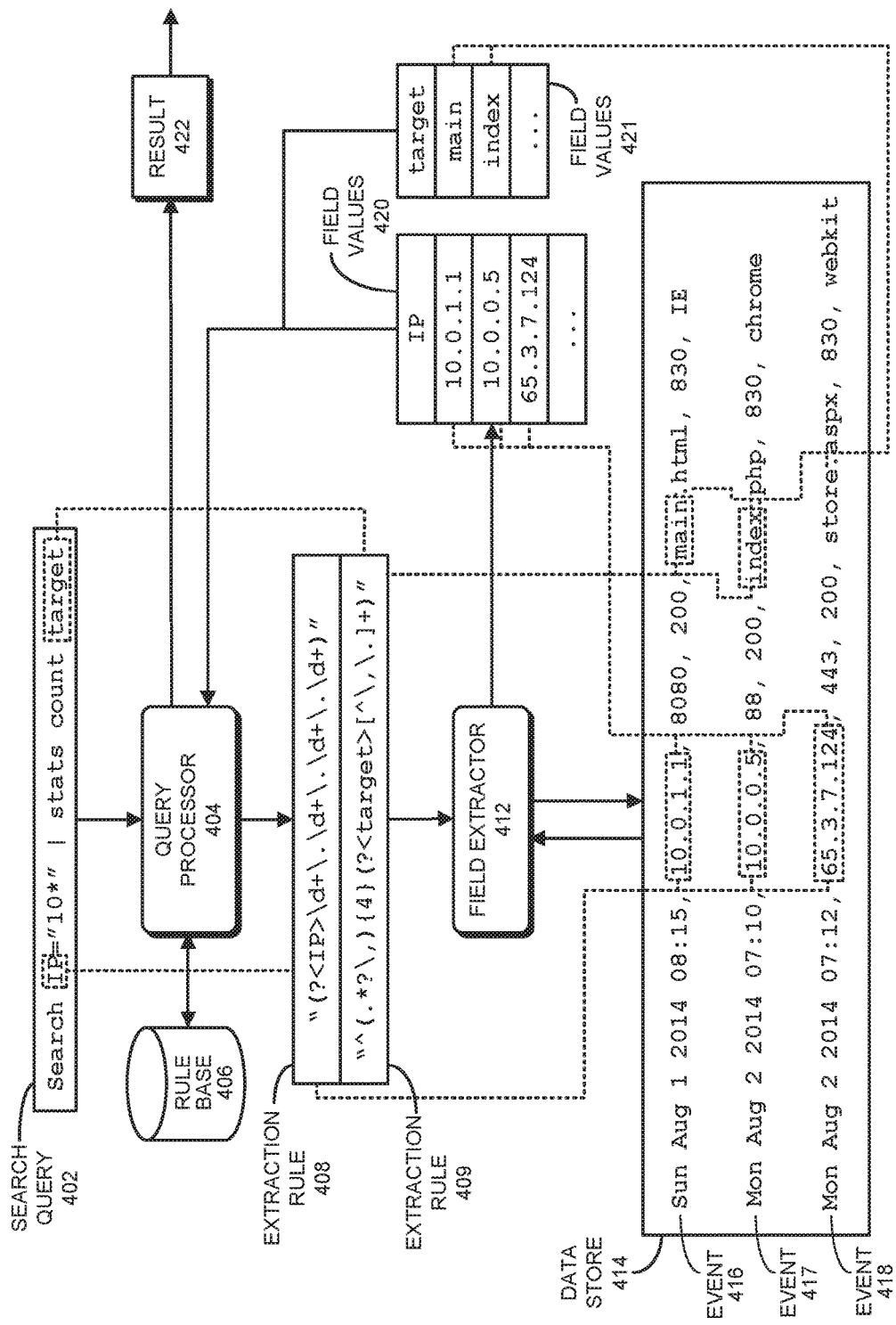
FIG. 7 presents a block diagram of a system for processing search requests that uses extraction rules for field values in accordance with one or more aspects of the present disclosure.

FIG. 7 presents a block diagram illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102. Note that the exemplary search query 402 illustrated in FIG. 7 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 414, and consequently determines that query processor 404 needs to use extraction rules to extract values for the fields. Hence, query processor 404 performs a lookup for the extraction rules in a rule base 406, wherein rule base 406 maps field names to corresponding extraction rules and obtains extraction rules 408-409, wherein extraction rule 408 specifies how to extract a value for the "IP" field from an event, and extraction rule 409 specifies how to extract a value for the "target" field from an event. As is illustrated in FIG. 7, extraction rules 408-409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-418 illustrated in FIG. 7. Moreover, the query processor 404 can instruct field extractor 412 to apply the extraction rules to all the events in a data store 414, or to a subset of the events that have been filtered based on some criteria.

Next, field extractor 412 applies extraction rule 408 for the first command "Search IP="10*"" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digits, followed by another period, and followed again by one or more digits. Next, field extractor 412 returns field values 420 to query processor 404, which uses the criterion IP="10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

Figure 9A:
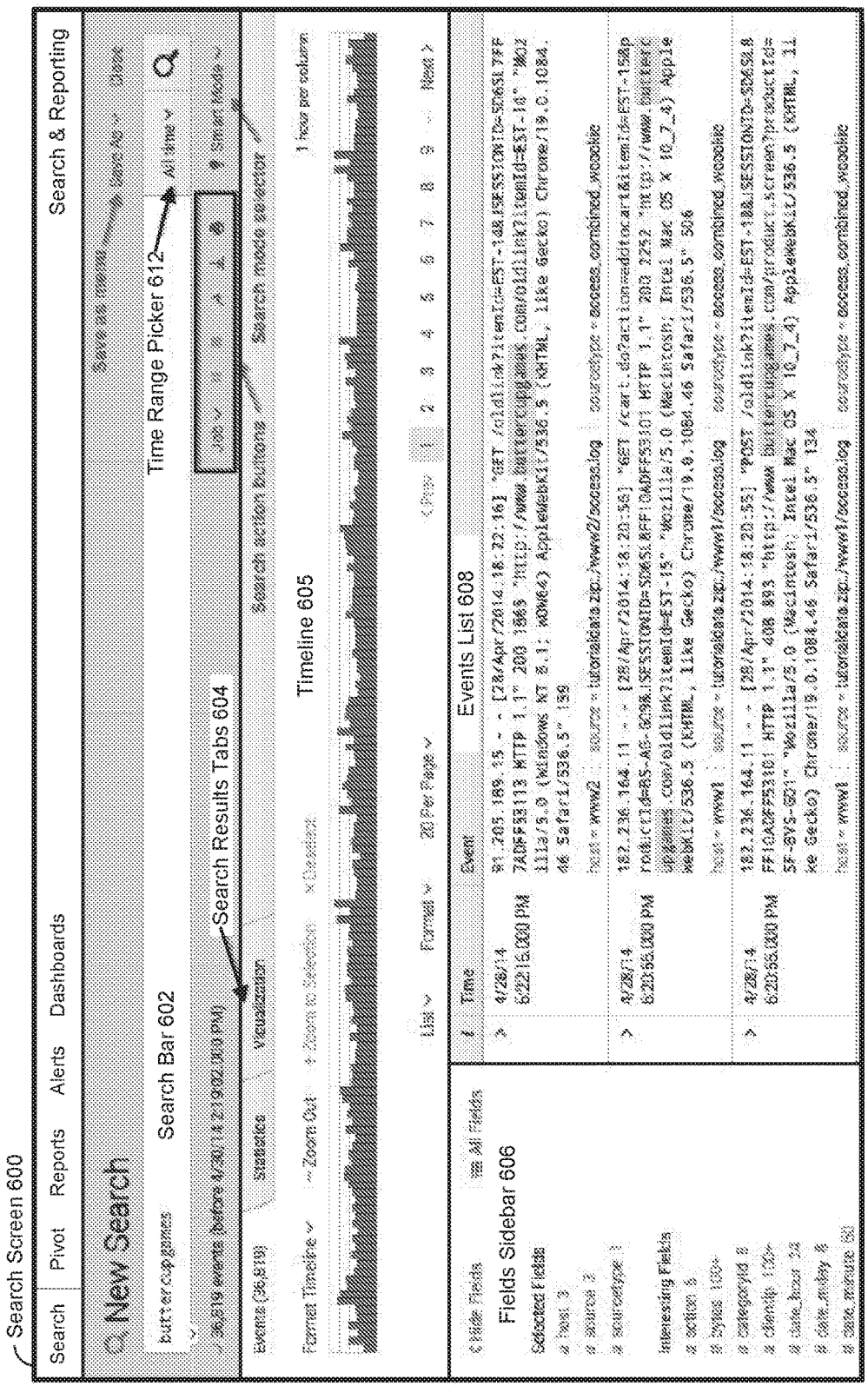
FIG. 9A illustrates a search screen in accordance with one or more aspects of the present disclosure.
Figure 9B:
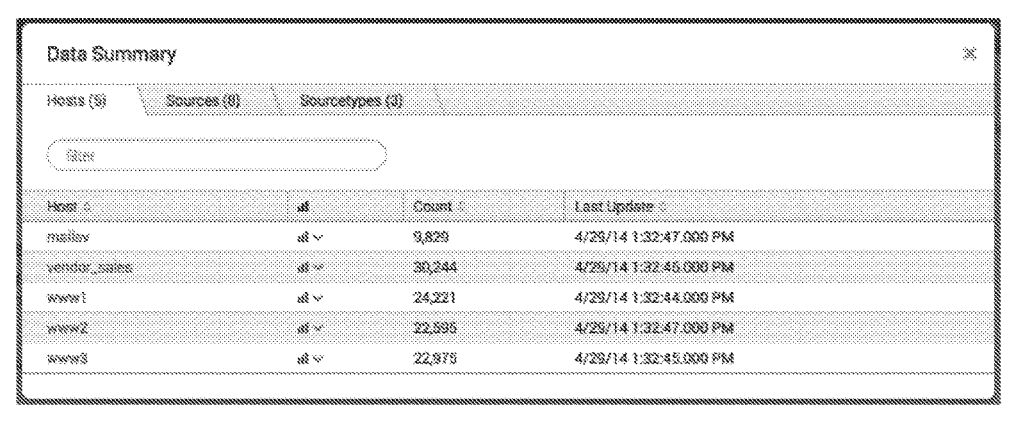

FIG. 9A illustrates an exemplary search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 9B that enables the user to select different sources for the event data, for example by selecting specific hosts and log files.

After the search is executed, the search screen 600 can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 9A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

To facilitate faster query processing, a query can be structured as a map-reduce computation, wherein the "map" operations are delegated to the indexers, while the corresponding "reduce" operations are performed locally at the search head. For example, FIG. 8 illustrates how a search query 501 received from a client at search head 104 can split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 6, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

As described above with reference to the flow charts in FIGS. 6 and 7, event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. Pat. No. 9,215,240 issues on Dec. 15, 2015 and U.S. Pat. No. 8,826,434 issued on Sep. 2, 2014.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 10A:
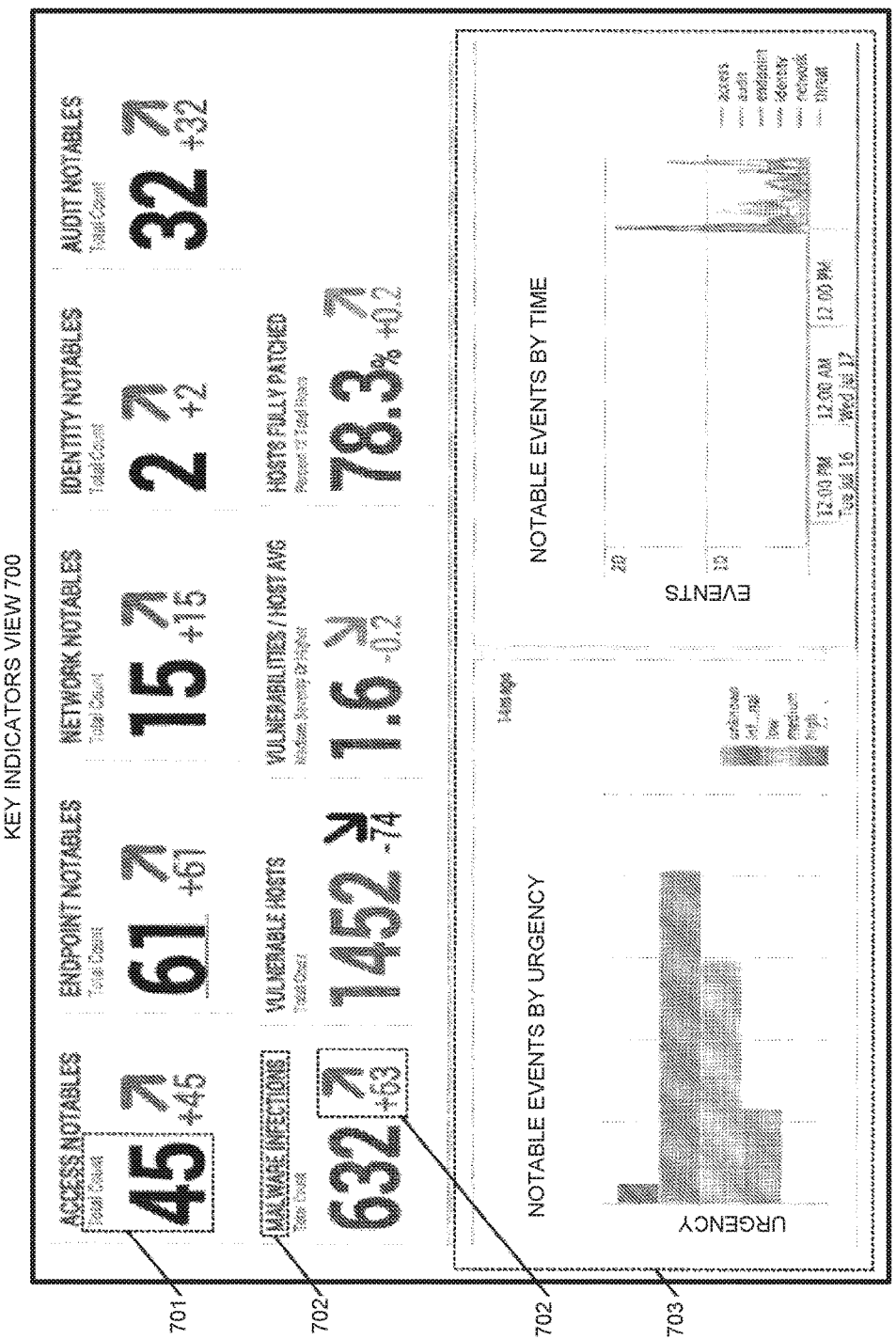
FIG. 10A illustrates a key indicators view in accordance with one or more aspects of the present disclosure.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 10A illustrates an exemplary key indicators view 700 that comprises a dashboard, which can display a value 701, for various security-related metrics, such as malware infections 702. It can also display a change in a metric value 703, which indicates that the number of malware infections increased by 63 during the preceding interval. Key indicators view 700 additionally displays a histogram panel 704 that displays a histogram of notable events organized by urgency values, and a histogram of notable events organized by time intervals. This key indicators view is described in further detail in pending U.S. patent application Ser. No. 13/956,338 filed Jul. 31, 2013.

Figure 10B:
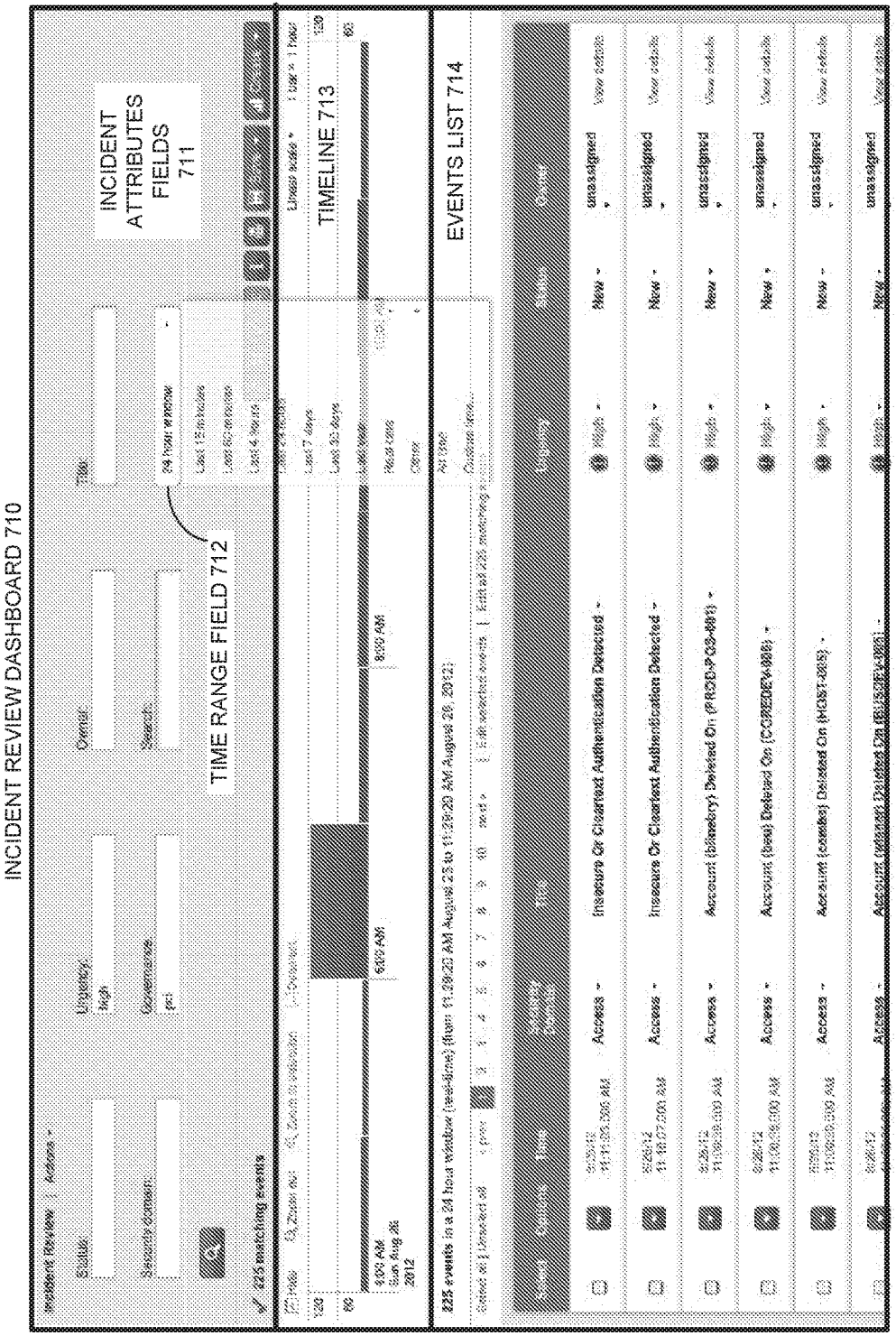
FIG. 10B illustrates an incident review dashboard in accordance with one or more aspects of the present disclosure.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 10B illustrates an exemplary incident review dashboard 710 that includes a set of incident attribute fields 711 that, for example, enables a user to specify a time range field 712 for the displayed events. It also includes a timeline 713 that graphically illustrates the number of incidents that occurred in one-hour time intervals over the selected time range. It additionally displays an events list 714 that enables a user to view a list of all of the notable events that match the criteria in the incident attributes fields 711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/ User/IncidentReviewdashboard."

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent application Ser. No. 14/167,316 filed 29 Jan. 2014, which is hereby incorporated herein by reference. Also, see "vSphere Monitoring and Performance," Update 1, vSphere 5.5, EN-001357-02, http://pubs.vmware.com/vsphere-55/topic/com.vmware- .ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 10C:
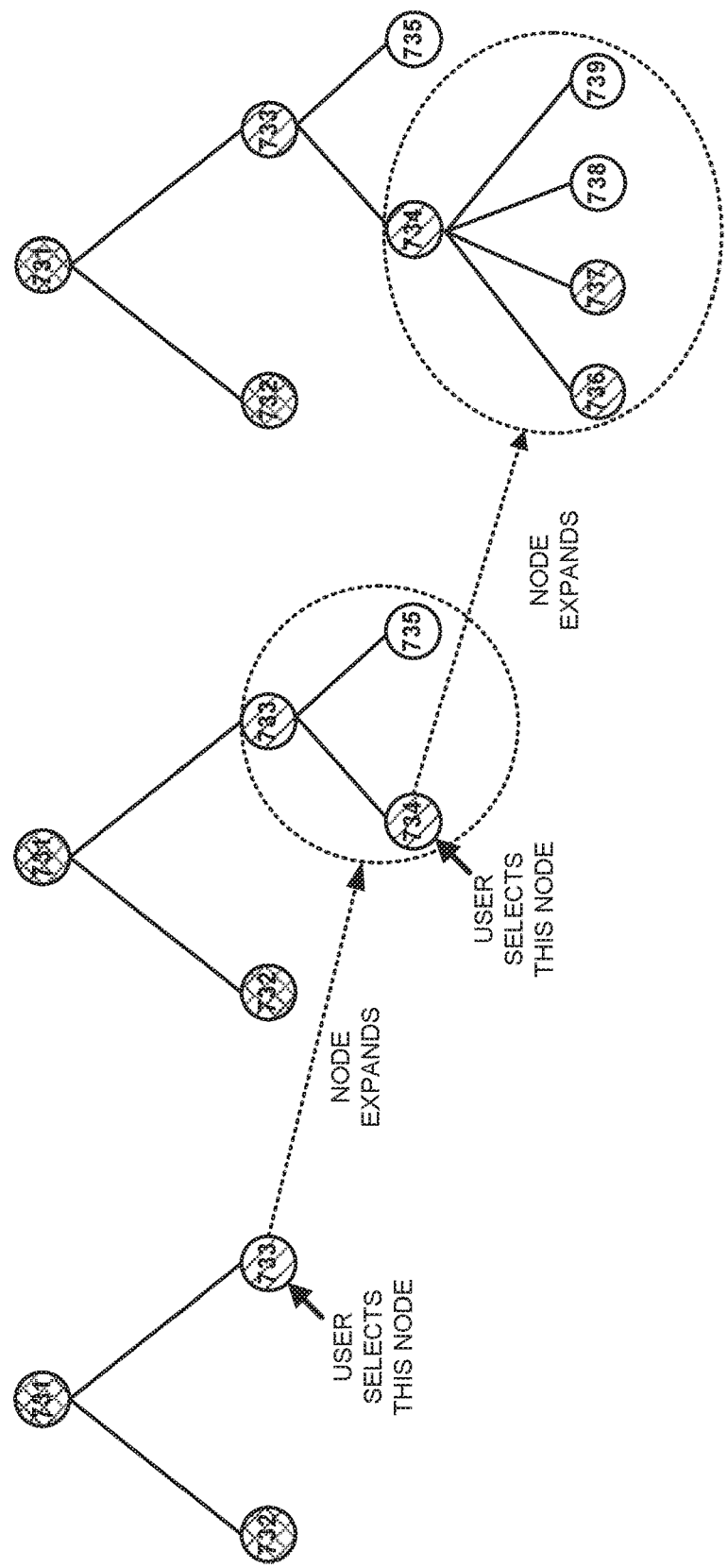
FIG. 10C illustrates a proactive monitoring tree in accordance with one or more aspects of the present disclosure.
Figure 10D:
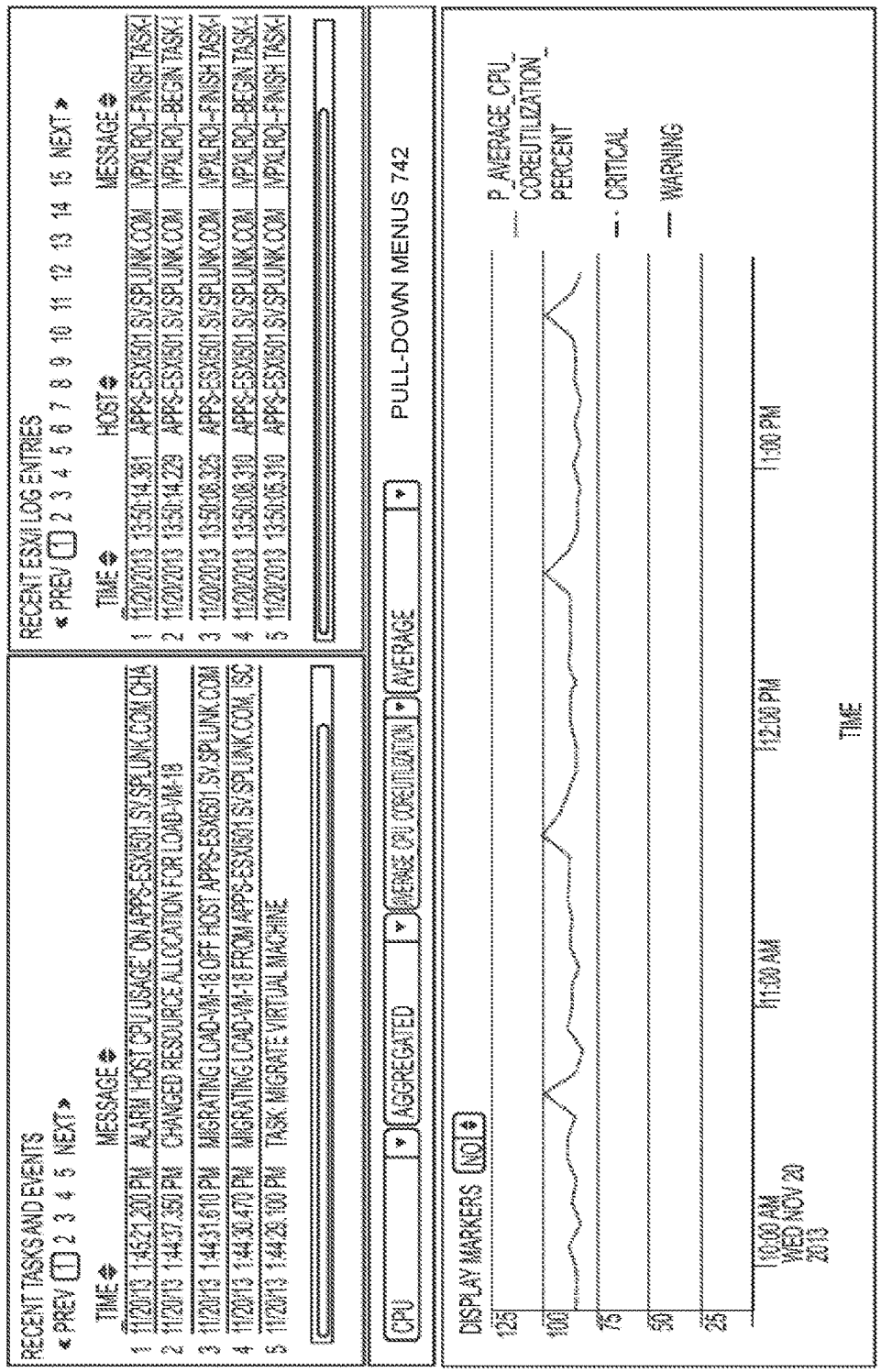
FIG. 10D illustrates a screen displaying both log data and performance data in accordance with one or more aspects of the present disclosure.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 10C, wherein nodes 733 and 734 are selectively expanded. Note that nodes 731-739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. Pat. No. 8,972,992 issued on Mar. 3, 2015, which is hereby incorporated herein by reference for all possible purposes.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 10D displays a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

Figure 11:
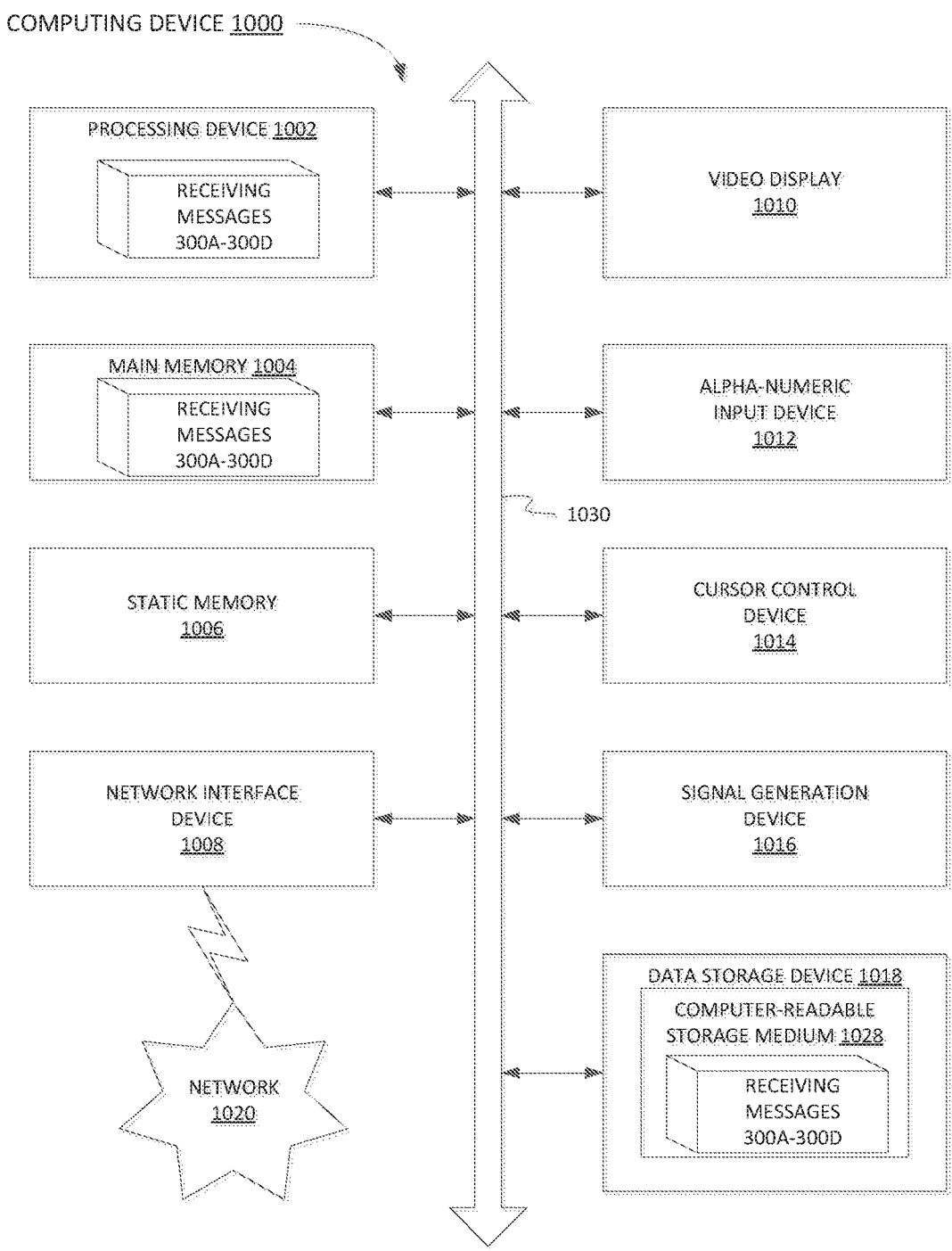
FIG. 11 depicts a block diagram of an example computing device operating in accordance with one or more aspects of the present disclosure.

FIG. 11 illustrates a diagrammatic representation of a computing device 1000 within which a set of instructions for causing the computing device to perform the methods discussed herein may be executed. The computing device 1000 may be connected to other computing devices in a LAN, an intranet, an extranet, and/or the Internet. The computing device 1000 may operate in the capacity of a server machine in client-server network environment. The computing device 1000 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein. In illustrative examples, the computing device 1000 may implement the above described methods 300A-300D for processing of messages that are asynchronously being received from multiple servers.

The example computing device 1000 may include a processing device (e.g., a general purpose processor) 1002, a main memory 1004 (e.g., synchronous dynamic random access memory (DRAM), read-only memory (ROM)), a static memory 1006 (e.g., flash memory and a data storage device 1018), which may communicate with each other via a bus 1030.

The processing device 1002 may be provided by one or more general-purpose processing devices such as a microprocessor, central processing unit, or the like. In an illustrative example, the processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also comprise one or more special-purpose processing devices such as an application specific integrated circuit (ASIC), a field programmable gate array (FPGA), a digital signal processor (DSP), a network processor, or the like. The processing device 1002 may be configured to execute the methods 300A-300D for processing of messages that are asynchronously being received from multiple servers, in accordance with one or more aspects of the present disclosure.

The computing device 1000 may further include a network interface device 1008, which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

The data storage device 1018 may include a computer-readable storage medium 1028 on which may be stored one or more sets of instructions (e.g., instructions of the methods 300A-300D for processing of messages that are asynchronously being received from multiple servers, in accordance with one or more aspects of the present disclosure) implementing any one or more of the methods or functions described herein. Instructions implementing methods 300A-300D may also reside, completely or at least partially, within main memory 1004 and/or within processing device 1002 during execution thereof by computing device 1000, main memory 1004 and processing device 1002 also constituting computer-readable media. The instructions may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating," "identifying," "determining," "sending," "assigning," or the like refer to actions and processes performed or implemented by computing devices that manipulate and transform data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method operations. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
    transmitting, by a computer system, a search request to a plurality of search peers of a data aggregation and analysis system;
    receiving a plurality of data packets from the plurality of search peers;
    parsing, by a first processing thread of the computer system, one or more data packets of the plurality of data packets, to produce a partial response to the search request; and
    processing, by a second processing thread of the computer system, the partial response to produce a memory data structure representing an aggregated response to the search request.

2. The method of claim 1, further comprising:
    pre-processing the search request by replacing an identifier of a first function returning a first aggregated parameter with an identifier of a second function returning a second aggregated parameter.

3. The method of claim 1, wherein receiving the plurality of data packets further comprises:
    reading, in a non-blocking mode, data from one or more communication endpoints having at least one data packet available.

4. The method of claim 1, wherein parsing the data packets is performed by two or more processing threads operating in parallel, wherein each processing thread of the two or more processing threads produces a respective partial response to the search request.

5. The method of claim 1, wherein processing the partial response further comprises:
    splitting the partial response into two or more parts based on at least one of: a defined set of bit position or a defined separator.

6. The method of claim 1, wherein processing the partial response further comprises: encoding the partial response according to a defined encoding rule.

7. The method of claim 1, wherein receiving the plurality of data packets from the plurality of search peers is performed by the first processing thread.

8. The method of claim 1, wherein receiving the plurality of data packets from the plurality of search peers is performed by a third processing thread asynchronously with the respect to at least one of: the first processing thread or the second processing thread.

9. The method of claim 1, wherein parsing the one or more data packets is performed in an order of receiving the data packets over a plurality of transport layer connections.

10. The method of claim 1, wherein receiving the plurality of data packets is performed over a plurality of transport layer connections.

11. The method of claim 1, further comprising:
writing the partial response to a message queue; and
responsive to determining that a total size of messages in the message queue exceeds a certain threshold, causing the first processing thread to suspend receiving data packets.

12. The method of claim 11, further comprising:
responsive to determining that a total size of messages in the message queue falls below a certain threshold, notifying the first processing thread to resume receiving data packets.

13. The method of claim 1, wherein each search peer of the plurality of search peers performs map operations of a map-reduce search, to return partial results based on a subset of source data.

14. The method of claim 1, wherein the partial response comprises one or more events derived from time-series source data.

15. The method of claim 1, wherein the method is performed by a search head that performs map operations of a map-reduce search.

16. A computer system, comprising:
a memory; and
one or more processing devices, coupled to the memory, to:
transmit a search request to a plurality of search peers of a data aggregation and analysis system;
receive a plurality of data packets from the plurality of search peers;
parse, by a first processing thread of the computer system, one or more data packets of the plurality of data packets, to produce a partial response to the search request; and
process, by a second processing thread of the computer system, the partial response to produce a memory data structure representing an aggregated response to the search request.

17. The system of claim 16, wherein the one or more processing devices are further to:
write the partial response to a message queue; and
responsive to determining that a total size of messages in the message queue exceeds a certain threshold, cause the first processing thread to suspend receiving data packets.

18. The system of claim 16, wherein the one or more processing devices are further to:
pre-process the search request by replacing an identifier of a first function returning a first aggregated parameter with an identifier of a second function returning a second aggregated parameter.

19. The system of claim 17, wherein each search peer of the plurality of search peers performs map operations of a map-reduce search, to return partial results based on a subset of source data.

20. A computer-readable non-transitory storage medium comprising executable instructions that, when executed by a computer system, cause the computer system to:
transmit a search request to a plurality of search peers of a data aggregation and analysis system;
receive a plurality of data packets from the plurality of search peers;
parse, by a first processing thread of the computer system, one or more data packets of the plurality of data packets, to produce a partial response to the search request; and
process, by a second processing thread of the computer system, the partial response to produce a memory data structure representing an aggregated response to the search request.

* * * * *